April 8, 1969 R. L. ROSENBERG ET AL 3,437,740

MATRIX BOARD APPARATUS

Filed Jan. 9, 1967 Sheet 1 of 3

INVENTORS:
ROGER L. ROSENBERG,
DONALD W. WATSON,
ROBERT D. ZIELINSKI
By: Mason, Kolehmainen, Rathburn & Wyss,
Attorneys.

INVENTORS:
ROGER L. ROSENBERG,
DONALD W. WATSON,
ROBERT D. ZIELINSKI

By: Mason, Kolehmainen, Rathburn & Wyss, Attorneys.

INVENTORS:
ROGER L. ROSENBERG
DONALD W. WATSON,
ROBERT D. ZIELINSKI
By: Mason, Kolehmainen, Rathburn & Wyss, Attorneys.

3,437,740
MATRIX BOARD APPARATUS

Roger L. Rosenberg and Donald W. Watson, Arlington Heights, and Robert D. Zielinski, Mount Prospect, Ill., assignors to C. P. Clare and Company, Chicago, Ill., a corporation of Delaware Filed Jan. 9, 1967, Ser. No. 608,062
Int. Cl. H05k 1/04, 1/16
U.S. Cl. 174—68.5 15 Claims

ABSTRACT OF THE DISCLOSURE

A matrix board includes a first array of conductors on one surface connected to terminals on the board, and a second, transverse array spaced from the board. Conductors on the other surface connect the transverse array to other terminals on the board. Diodes, resistors, etc., may be soldered or frictionally held between conductors of the first and second arrays. The board-mounted conductors may have apertures for frictionally receiving the coupling elements, the apertures defining flexible, centrally directed fingers. The second, spaced conductors may include rigid contact members with latching elements for releasably holding coupling elements against the contact members.

The present invention relates to matrix board apparatus and more particularly to improvements in matrix-type circuit boards or patch boards of the type including an array of conductors forming a two dimensional, or X–Y matrix, and also to improved connecting apparatus for use with circuit boards.

Matrix-type circuit boards or patch boards find use where preselected and easily arranged interconnections between different groups of conductors are required. Such boards are preferably constucted at least in part by the techniques of printed circuit manufacture, and are commonly plugged in to existing circuitry.

As an example, a matrix board may be used for automatic number identification in telephone systems. In such a system the board is arranged so that when a signal is applied to one input terminal of the board, as by operation of a line relay corresponding to a particular subscriber, the board provides a coded output signal representing the subscriber's telephone number. This coded output signal can be forwarded to automatic toll ticketing equipment for billing purposes, or can be used for other purposes. Matrix boards have many other uses in encoding, programming, etc.

Objects of the present invention are to provide an improved matrix board construction including a novel arrangement of conductors forming a two dimensional, or X–Y matrix in which the entire area of the board is used to advantage, in which a high density of conductors and components is possible, and in which the making of preselected connections between conductors is simplified.

Additional objects are to provide an improved matrix board of great flexibility wherein any or all possible interconnections between conductors can be conveniently made without increasing the space occupied by the board, and wherein the board connections can be easily and quickly changed.

Another object of the invention is to provide novel apparatus for conveniently, securely and releasably securing electrical elements such as diodes, resistors, wires, etc., to circuit boards.

In accordance with the above and other objects and advantages of the present invention, an embodiment of the invention may comprise a patch board of the type including a board formed of insulating material supporting a conductor array forming a two dimensional X–Y matrix. The board may be the plug-in type, and includes a first group of terminals which may, for convenience, be termed X terminals, and a second group of terminals which may be termed Y terminals. When the board is plugged in, these terminals make connection with preexisting circuitry.

On one surface of the board, a first or X group of conductors is supported in spaced, generally parallel relation. Each of these conductors is connected to one of the X terminals. Spaced above the surface of the board are a group of parallel-disposed Y conductors which extend transversely of the X conductors to form a latticework or criss-cross pattern in which each X conductor and Y conductor cross. The Y conductors are supported spaced from the board by conductive means. The other surface of the board opposite from the X conductors supports a group of conductors interconnecting the conductive support for each Y conductor with one of the Y terminals.

The arrangement is such that the entire area of the board is used to best advantage since the X conductors and the additional conductors are supported on opposite sides of the board, the Y conductors being spaced from the board. A plurality of coupling elements, such as diodes, resistors, wires, or the like, may be connected between the X conductors on the board surface and the Y conductors spaced from the board to provide desired interconnections. With the novel board construction of the present invention, as many coupling elements as desired may be placed between selected ones of the X and Y conductors, without increasing the space required by the board.

In accordance with a further feature of the invention, the coupling elements to be connected to the board may frictionally be attached to the X conductors and/or the Y conductors. With this arrangement, changes in the interconnections between the groups of conductors can be made easily, efficiently, and quickly so that the board is not damaged and so that the down time is minimized.

In accordance with a further feature of the invention, there may be provided novel apparatus for connecting a coupling element to a conductor bonded to the board surface. In accordance with this feature of the invention, a conductor in the form of a flat metal strip is bonded to one surface of the board, and one or more openings are provided in the board beneath the conductor. The conductor is provided with an aperture over each opening, the aperture being shaped so as to define a plurality of centrally directed flexible metallic fingers serving to hold and to establish an electrical connection with the coupling element when it is forced through the aperture.

In accordance with another feature of the invention, there is provided novel apparatus for connecting the end of a coupling element to a bus conductor extending above the board surface. Thus there is provided a rigid contact member supported above the board together with resiliently biased latch means mounted for movement adjacent the contact member and engageable with the coupling element. The latch means is resiliently biased to pinch the other end of the coupling element between the latch means and the contact member for holding and establishing an electrical connection with the coupling element.

The above and other objects and advantages of the present invention will appear from the following detailed description of illustrative embodiments of the invention. In the course of this description, reference is made to the accompanying drawings in which.

Figure 1:
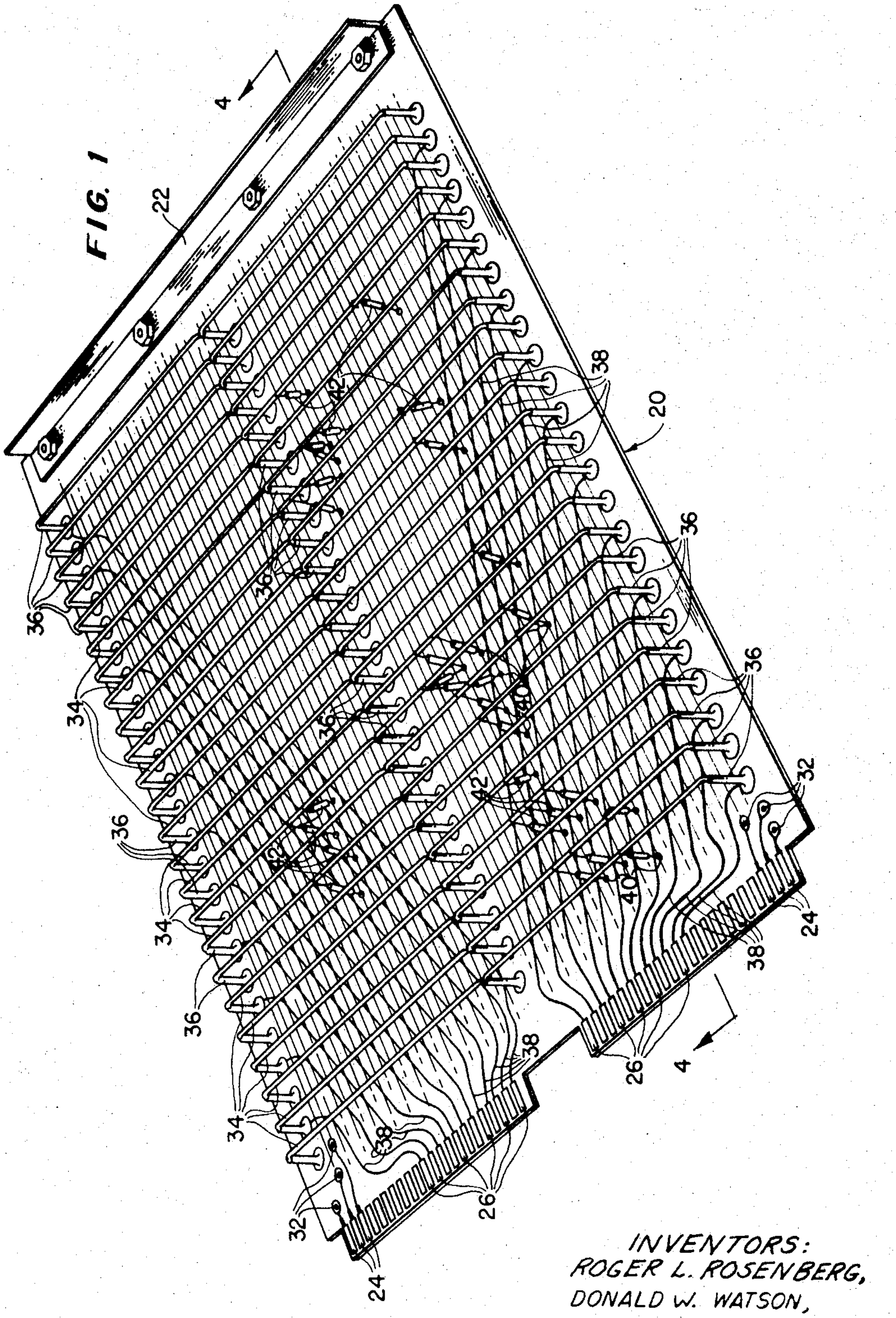
FIG. 1 is a perspective view illustrating one surface of a matrix board constructed in accordance with the present invention.

Referring now to the drawings and initially to FIGS. 1–4, there is illustrated a matrix board designated as a whole by the numeral 20 and constructed in accordance with the present invention. The board 20 is formed of a suitable insulating material, such as a thermoplastic resin impregnated paper laminate or the like. The board 20 is adapted to be plugged into existing circuitry, and for this purpose a stiffening element and handle 22 is attached to one end.

The edge of the board 20 is provided with a first group of terminals 24 (FIGS. 1 and 2), and a second group of terminals 26 (FIG. 1). These terminals are arranged on both sides of the board, and are adapted to engage frictional contact means when the board is plugged in, thereby to insert the board 20 in circuit.

In accordance with a feature of the present invention, the board 20 is provided with a novel arrangement of conductors forming a latticework or criss-cross network defining a two dimensional or X–Y matrix. Thus, on one surface of the board 20 (FIG. 2) there is arranged a plurality of spaced parallel-disposed conductors 28. Each of the conductors 28 is electrically connected to one of the terminals 24. Most of the terminals 24 lie on the same surface of the board 20 as the conductors 28, and these conductors and terminals are interconnected by short conductive paths 30. A few of the terminals 24 however lie on the opposite side of the board, and these terminals 24 are connected to conductors 28 by means of lead-throughs 32 extending through the board.

Spaced from the board surface and lying in a plane substantially parallel to the board is a plurality of conductors 34 (FIG. 1) comprising fairly rigid wires or buses. Each of the conductors 34 traverses the width of the board 20, and is supported by spaced metallic conductive posts 36. Supported on the surface of the board opposite the conductors 28 is a group of additional conductors 38 (FIG. 1), each of which extends between one of the terminals 26 and one of the conductive posts 36. Several openings 40 are associated with each of the conductors 28 (only a small number of the holes 40 are shown in FIG. 1), and extend through the conductor 28 and through the board 20.

Figures 2, 3:
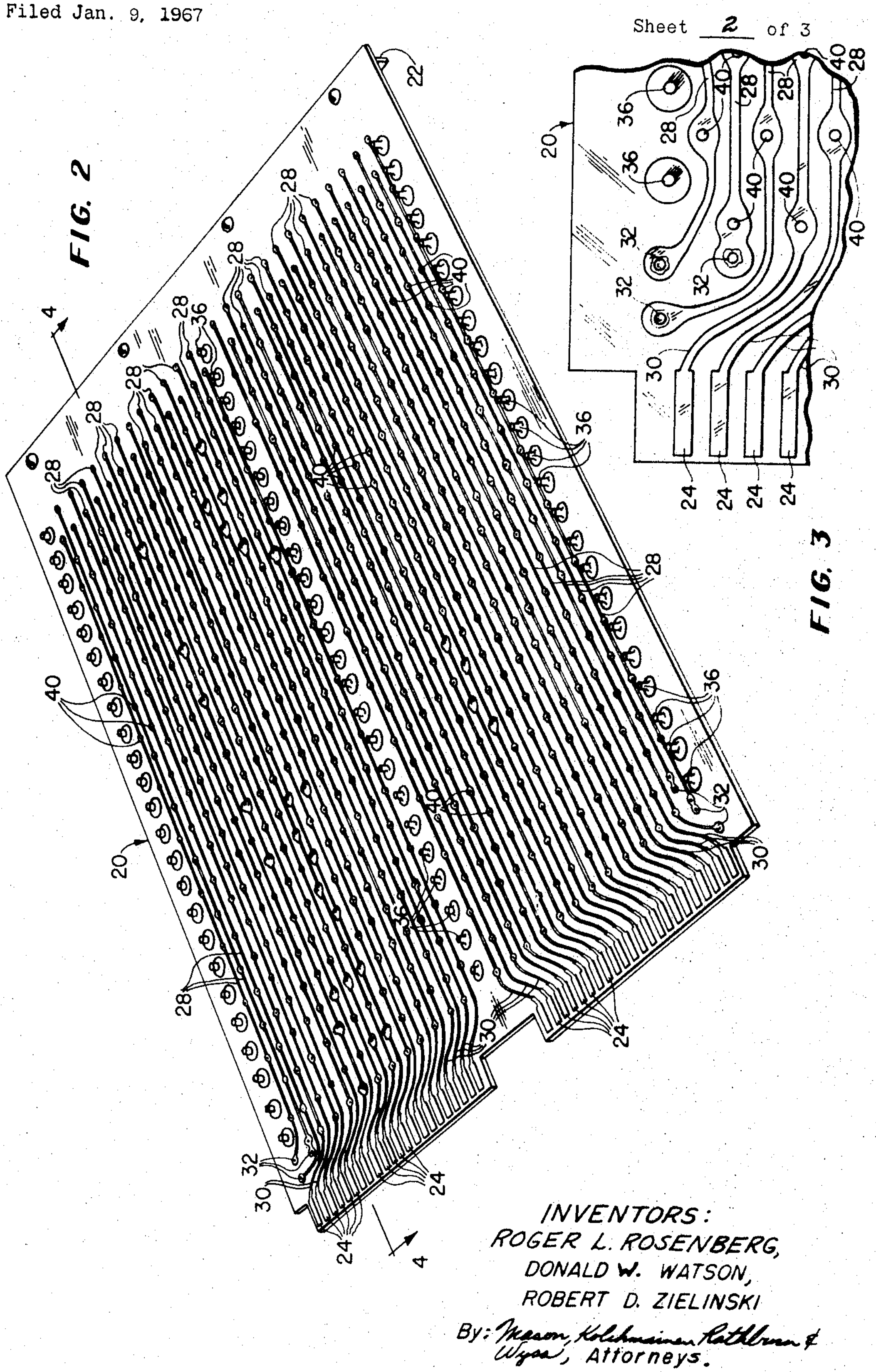
FIG. 2 is a perspective view of the opposite side of the board of FIG. 1.
FIG. 3 is a fragmentary, greatly enlarged elevational view of a portion of the surface of the board shown in FIG. 2.

The conductors 28 and 34 form a criss-cross formation or latticework defining the two dimensional, or X–Y matrix. The area of the board is used effectively to provide a high density of conductors. More specifically, since the conductors 28 and 38 are supported on opposite surfaces of the board, and thus are insulated from one another, no problem is encountered in trying to avoid intersections of the conductors 28 and 38. As a result, an area corresponding to almost the entire surface of the board can be used for the array of conductors 28 and for the array of the conductors 38, and additionally for the array of the conductors 34 spaced from the board. As a result, and as best seen in FIGS. 1 and 2, the latticework formed of the conductors 28 and the conductors 34 covers an area substantially as large as the board surface.

It should be appreciated that each of the group of terminals 24 is connected to one of the conductors 28, and similarly each of the terminals 26 is connected to one of the group of conductors 34. In accordance with a feature of the invention, and because of the novel configuration and location of the various conductors, selected interconnections may be made where and in the quantity desired between any of conductors 28 and any of the conductors 34. Such interconnections may be made by any desired coupling elements such as diodes 42, as illustrated in the drawings, or alternatively by resistors, wires or the like.

Each diode 42 includes a pair of wire terminal portions or leads. In connecting a diode to the board 20 (FIG. 4) one lead of the diode is passed through an opening 40 and soldered into place to make a connection with a selected one of the conductors 28. The other end of the diode is wrapped around a selected one of the conductors 34 and soldered into place. As many connections as desired may be made, without increasing the space required by the board. Since the diodes extend in a direction substantially normal to the board, it is not necessary for the diodes, or other coupling elements, to overlie one another, and as a result each diode is accessible. In fact, each of the conductors 28 could be connected to each of the conductors 34 if desired.

Figures 4, 5, 6:
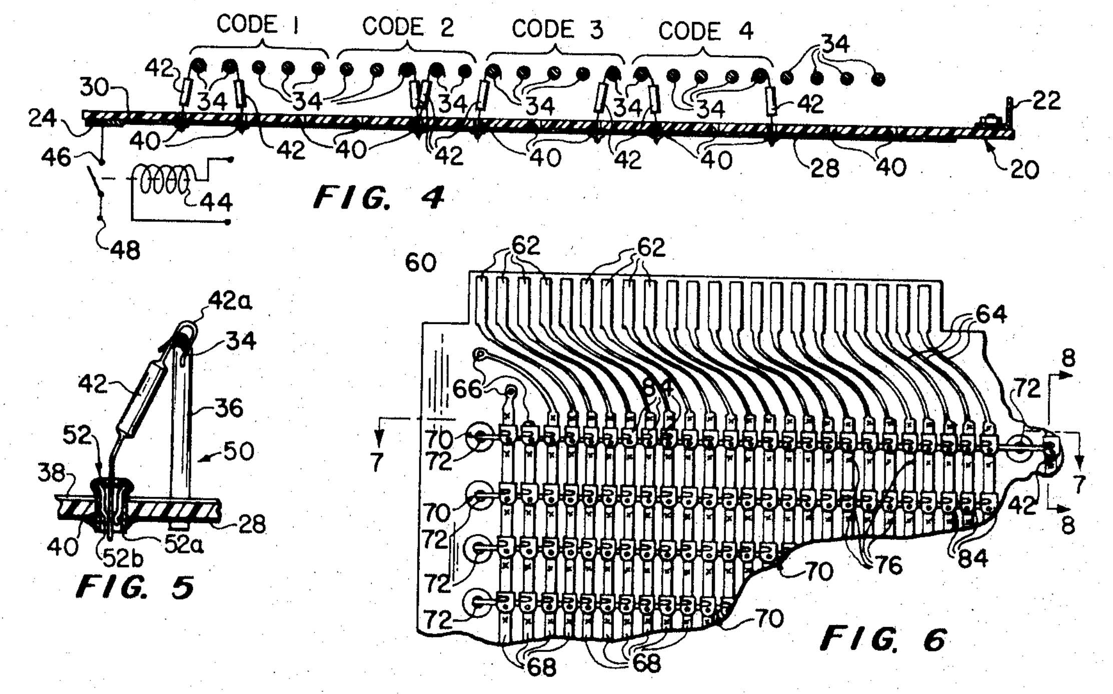
FIG. 4 is a sectional, partly diagrammatic view taken along the lines 4—4 of FIG. 1 and FIG. 2.
FIG. 5 is a fragmentary, greatly enlarged, sectional view of a portion of a matrix board constituting an alternative embodiment of the invention.
FIG. 6 is a fragmentary, elevational view of a portion of one surface of a matrix board comprising yet another embodiment of the invention.

As noted previously, one use to which the matrix board 20 may be put is for automatic number identification in telephone systems. Referring now to FIG. 4, the board 20 is diagramatically and sectionally illustrated as it might be set up for this purpose. Thus there is schematically shown a relay including a winding 44 and a set of normally open relay contacts 46. The relay, for example, may be one of a group of line relays, each associated with a particular telephone subscriber, and each associated with one of the conductors 28. When the subscriber's telephone is placed off-hook, the winding 44 is energized by well-known circuitry to close the relay contacts 46. The closure of the contacts 46 connects one of the first group of terminals 24 on the matrix board 20 to a terminal 48 that is connected to a suitable potential source.

In the case illustrated in FIG. 4, several diodes 42 are connected between the conductor 28 corresponding to the subscriber and various ones of the conductors 34. The connections to the conductors 34 are made so that a coded output signal is provided corresponding to the subscriber number on the basis of, for instance, a 2 of 5 code. The arrangement illustrated includes twenty-four conductors 34, twenty of which are used to code four digits, and the remaining four of which may be used for other purposes such as special service marking or the like. The twenty coding conductors are divided into four groups of five adjacent conductors to which are assigned the binary weights 0, 1, 2, 4 and 7. If the subscriber's number is assumed to be "1677" and if the conductors 34 are assigned the weight 0, 1, 2, 4 and 7 considered from left to right in FIG. 4, the first code digit "1" is coded by diode coupling the energized conductor 28 to the "0" and "1" conductor in the first group of five conductors 34. In a similar manner, the second digit "6" is coded by coupling the conductor 28 through two diodes 42 to the two conductors 34 to which weight "2" and "4" are assigned in the second group of five conductors 34. The coded signal provided when the relay winding 44 is energized may be forwarded from the terminals 26 to, for instance, suitable toll ticketing equipment or may be stored or used for other purposes. Many other uses for the matrix board 20 will be apparent to those skilled in the art.

Preferably the matrix board 20 may be constructed in large part using the techniques of printed circuit board construction. Thus the contacts 24 and 26 and the conductors 28 and 30 may be in the form of thin flat metallic layers suitably applied to the surfaces of the board. In addition, the conductive posts 36 can be attached to the board by well-known flow soldering or dip soldering techniques.

Referring now to FIG. 5, there is illustrated a portion of a matrix board designated as 50 and comprising an alternative embodiment of the invention. The matrix board 50 is similar in many respects to the matrix board 20 described above, and similar portions thereof are provided with similar reference numerals.

In accordance with a feature of the present invention, the matrix board 50 is provided with means with which coupling elements, such as the diode 42 illustrated in FIG. 5, may be quickly and detachably connected to the board. Thus, one lead of the diode 42 is shaped into a spring clip like arrangement designated as **42*a* in FIG. 5. When the diode 42 is slipped into position, the spring clip portion 42*a* frictionally engages the conductor 34** and makes an electrical connection therewith.

Each of the openings 40 which extend through the board 50 and through the conductor 28 is provided with a friction socket 52 including an outer casing **52*a* soldered to the conductor 28 and an inner portion 52*b* which makes a friction contact with the lead of the diode 42. When the lower lead of the diode is inserted into the friction socket 52, an electrical connection is made between the conductor 28 and the diode 42**.

Having reference now to FIGS. 6–10, there is illustrated a matrix board generally illustrated as 60 comprising another embodiment of the present invention. The board 60 includes a first group of terminals 62, many of which are illustrated in FIG. 6. Each of the terminals 62 is connected by a short conductive path 64 or by a lead-through element 66 to one of a group of spaced parallel-disposed conductors 68.

There is also provided a second group of conductors each designated as 70 disposed parallel to one another and in a plane spaced from and parallel to the board. Each of these conductors 70 is supported by conductive posts 72 carried by and passing through the board 60. The surface of the board opposite the conductors 68 (not shown) is provided with an array of conductors similar to the conductors 38 described in connection with the first embodiment and illustrated in FIG. 1. Each of these conductors (not shown) extends between one of a second group of terminals (not shown) and a conductive post 72 supporting one of the conductors 70. Thus, the board 60 is similar to the matrix board 20 in that there are provided first and second group of terminals each of which is connected to one of first and second groups of conductors 68 and 70 forming a latticework or criss-cross matrix.

As will be explained in greater detail hereinafter, the board 60 includes provision for mounting coupling elements, such as diodes or other elements, between selected ones of the conductors 68 and the conductors 70. Thus, the matrix board 60 includes all of the novel features and the advantages of the matrix board 20 described above. In addition, and in accordance with features of the present invention, the matrix board 60 is provided with novel apparatus for connecting coupling elements to the board and between selected ones of the conductors.

Figures 9, 10:
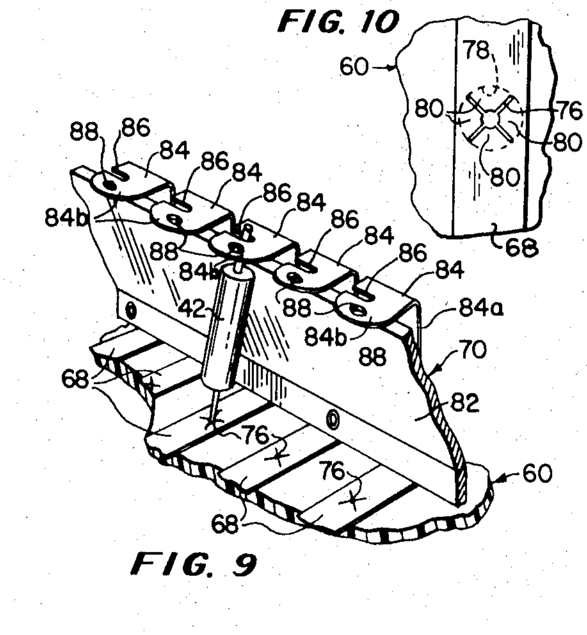
FIG. 9 is an enlarged, fragmentary, perspective view of a portion of the apparatus shown in FIG. 6.
FIG. 10 is a greatly enlarged, fragmentary, elevational view of a portion of the apparatus shown in FIG. 6.
Figure 8:
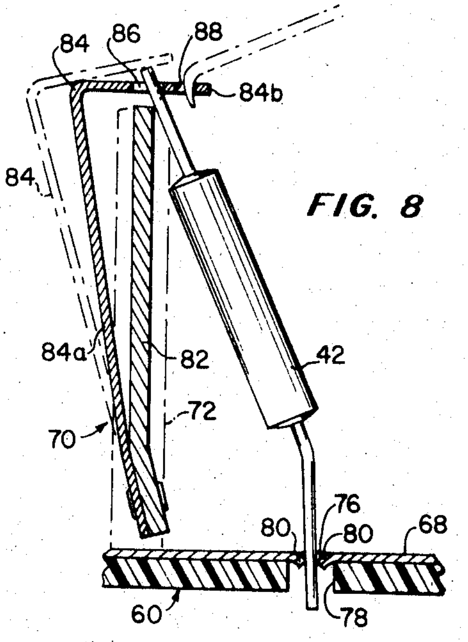
FIG. 8 is a greatly enlarged sectional view taken along the line 8—8 of FIG. 6.

Referring now particularly to FIGS. 8, 9 and 10, the board 60 is provided with novel means for connecting one of the wire terminal portions of a coupling element such as an illustrated diode 42 to a selected one of the conductors 68. Thus each conductor 68 is provided with a series of apertures 76, one in the area beneath each of the conductors 70. Beneath each aperture 76, the board is provided with a recess 78 (FIGS. 8 and 10) preferably comprising an opening passing through the board.

Each aperture 76, as appears most clearly in FIG. 10, is X-shaped so as to define a plurality of centrally directed, resilient, flexible, metallic fingers 80. When the wire terminal portion or lead of the diode 42 is forced through the aperture 76 and into the opening 78, the fingers 80 are flexed downwardly (FIG. 8) and the sharp edges of the tips of the fingers 80 engage and establish an electrical contact with the terminal portion or lead of the diode. The electrical contact with the diode is quite good because of the engagement of the sharp edges of the fingers 80 with the lead, and because of the fact that the flexible fingers 80 are continuously biased against the lead.

It should be understood that, as with the matrix board 20 described above, the techniques of printed circuit board construction may be applied to the construction of the board 60. However, it has been found that the conductors 68 can be formed by an etching process or other process indepedently of the board 60 and then applied by a suitable bonding adhesive. In this way the conductors 68 can be made sufficiently thick so that the centrally directed fingers 80 provided by the apertures 76 are strong enough to hold a coupling element in place.

In accordance with another feature of the invention, there is provided novel apparatus for connecting the other end of the diode 42 to the conductors 70. Each conductor 70 includes a rigid contact element 82 of generally rectangular cross sectional shape, extending across the board 60. Disposed along each contact member 82, one for each of the conductors 68, are a plurality of L-shaped members 84 each including a first leg **84*a* attached to the contact member 82 and a second leg 84*b* having a recess 86 defining a latch element movable adjacent one end of the contact member 82 and engageable with the wire terminal portion of the coupling element 42. In addition, the leg 34*b* includes a small opening 88** for receiving a tool such as that shown in broken lines in FIG. 8 for manipulating the latch portion.

The L-shaped members 84 are formed of flexible, resilient material which may be metal or other material. Each member 84 normally assumes the position shown in broken lines in FIG. 8. In order to mount a diode 42, the leg portion **84*b* is pulled over the top of the contact member 82 and the wire terminal portion of the diode is inserted in the recess 86. When the leg 84*b* is released, the leg 84*a* resiliently biases the latch portion in the opposite direction back toward its normal position, and the wire terminal portion of the diode 42 is firmly pinched between the rigid contact member 82 and the leg 84*b*. Thus the diode 42 is firmly held in place and a good electrical contact is made by the sharp corner of the rigid member 82**.

Figure 7:
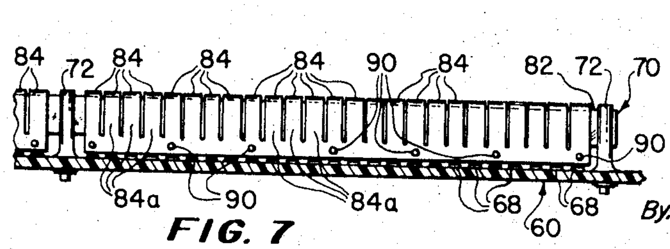
FIG. 7 is a sectional view taken along the line 7—7 of FIG. 6.

Referring to FIG. 7, it may be seen that if desired, the plurality of L-shaped members 84 associated with each rigid contact member 82 may in fact be formed of a single strip of material provided with suitable slits and bent over near the top, the material being attached to the contact member 82 by means of several rivets 90.

Not only can the diodes 42 (or other coupling members) be easily connected into desired positions on the board 60 between selected ones of the conductors 68 and 70, but also the diode connections can quickly be changed or removed. In order to remove a diode from a conductor 70, the L-shaped member 84 is moved against the contact member 82, and the diode lead is removed from the recess 86. Then the diode is pulled from the aperture 76 in the conductor 68.

In a device constructed in accordance with the invention, it was found to be preferable not to pull the diode from the aperture 76 because since the diode is held tightly, the fingers 80 may be bent or damaged. Removal of the diode is easily accomplished by forcing the fingers downwardly to release the wire lead, extracting the wire lead, and releasing the fingers 80 whereupon they return to their original positions ready for reuse. This operation can be accomplished, for example, with a C-shaped tube-like tool partially surrounding the wire lead.

While the present invention has been illustrated and described in connection with the details of specific embodiments thereof, it should be understood that various other modifications and alterations can be devised by those skilled in the art. It is intended to cover all such alternatives and embodiments which fall within the scope of the appended claims.

What is claimed as new and desired to be secured by Letters Patent of the United States is:

1. In patchboard apparatus of the type including a board formed of insulating material and a conductor array forming an X–Y matrix, the improvement characterized by:

a group of X terminals supported by the board;
a group of parallel-disposed spaced X conductors supported on one surface of the board;
means electrically connecting said X terminals and conductors;
a group of Y terminals supported by the board;
a group of spaced parallel-disposed Y conductors disposed in a plane spaced from the board, said Y conductors extending tranversely of said X conductors;
conductive supporting means mounted on the board supporting said Y conductors;
and a group of additional conductors supported on the surface of the board opposite said one surface, each extending between one of said Y terminals and the conductive supporting means of one of said Y conductors.

2. Patchboard apparatus as claimed in claim 1, the matrix of said X and Y conductors covering an area substantially as great as the area of the board.

3. Patchboard apparatus as claimed in claim 1 additionally comprising at least one coupling element extending between said one surface of the board and said plane, and connected between one of said X conductors and one of said Y conductors to establish a signal path therebetween.

4. Patchboard apparatus as claimed in claim 3, said coupling element including wire terminal portions soldered to said conductors.

5. Patchboard apparatus an claimed in claim 3, said coupling element including a wire terminal portion frictionally and releasably engaged with said Y conductor.

6. Patchboard apparatus as claimed in claim 3 in which each coupling element includes two leads, one of which is electrically connected to an X conductor and in which a plurality of resiliently biased latch means are mounted along each Y conductor to receive and resiliently bias against the Y conductor the other lead of the coupling element.

7. Patchboard apparatus as claimed in claim 6 in which the Y conductor includes a sharp corner engaging said other lead.

8. Patchboard apparatus as claimed in claim 6 in which the latch means include a generally L-shaped resilient member having a first and second leg, the first leg being secured to the Y conductor and the second leg engaging the lead.

9. Patchboard apparatus as claimed in claim 1, said X conductors and said additional conductors being bonded to the board surface throughout their lengths.

10. Patchboard apparatus as claimed in claim 9, additionally comprising a plurality of openings extending through said board beneath each of said X conductors.

11. Patchboard apparatus as claimed in claim 10:

a plurality of friction connecting means electrically connected to said X conductors, each aligned with one of said openings;
at least one coupling element having a first terminal portion connected to one of said Y conductors;
said coupling element having a second, wire terminal portion frictionally held in one of said friction connecting means.

12. Patchboard apparatus as claimed in claim 11, said X conductors comprising flat metallic strips, and said friction connecting means comprising apertures in said strips overlying said openings, each aperture defining a plurality of inwardly directed centrally converging flexible metallic fingers effective simultaneously to hold and establish an electrical connection with said wire terminal portion.

13. Patchboard apparatus as claimed in claim 11, said friction connecting means comprising socket members disposed in said openings.

14. In patchboard apparatus of the type including a board formed of insulating material supporting a conductor array forming an X–Y matrix, and adapted for use with at least one coupling element having wire terminal portions for providing a selected X–Y interconnection, the improvement comprising:

a group of parallel-disposed spaced X conductors supported on the surface of the board, said X conductors comprising strips of metallic material bonded to the board;
a group of parallel-disposed Y conductors supported in a plane spaced from and parallel to the board, said Y conductors extending transversely of said X conductors;
holding means electrically connected to each of said X conductors for holding one terminal portion of a coupling element;
each of said Y conductors comprising a rigid bus member extending across every X conductor;
and a plurality of generally L-shaped flexible elements disposed along the length of each bus member and each including a first leg forming a latch portion movable adjacent the bus member and engageable with the other terminal portion of a coupling element;
said L-shaped elements each including a second leg attached to said bus member for resiliently biasing the latch portion so as to pinch the other terminal portion between said latch portion and the bus member.

15. The improvement claimed in claim 14:

said holding means comprising a recess in the board beneath each X conductor near each intersection with a Y conductor;
and an aperture in each X conductor over each recess;
each said aperture defining a plurality of centrally directed flexible metallic fingers for simultaneously holding and establishing electrical contact with the one terminal portion of a coupling element when the one terminal portion is moved through the aperture.

References Cited

UNITED STATES PATENTS

| | | | |
|---|---|---|---|
| 2,990,499 | 6/1961 | Cordes. | |
| 3,393,449 | 7/1968 | Garcia -------- | 174—68.5 XR |

DARRELL L. CLAY, *Primary Examiner.*

U.S. Cl. X.R.

317—101; 339—17.18; 29—626